(12) United States Patent
Gapontsev et al.

(10) Patent No.: US 7,876,805 B2
(45) Date of Patent: Jan. 25, 2011

(54) DYNAMIC COMPENSATOR FOR CONTROLLING STRESSES ON FIBER IN FIBER OPTIC CABLES

(76) Inventors: Valentin P Gapontsev, 50 Old Webster Rd., Oxford, MA (US) 01540; Valentin Fomin, 50 Old Webster Rd., Oxford, MA (US) 01540; Andrey Abramov, 50 Old Webster Rd., Oxford, MA (US) 01540; Dimitri Yagodkin, 50 Old Webster Rd., Oxford, MA (US) 01540

( * ) Notice: Subject to any disclaimer, the term of this patent is extended or adjusted under 35 U.S.C. 154(b) by 117 days.

(21) Appl. No.: 12/486,860

(22) Filed: Jun. 18, 2009

(65) Prior Publication Data
US 2010/0322268 A1  Dec. 23, 2010

(51) Int. Cl.
*H01S 3/00* (2006.01)
(52) U.S. Cl. ............................. 372/109; 372/6; 385/135
(58) Field of Classification Search .................. 372/109, 372/108; 242/378.2; 385/135
See application file for complete search history.

(56) References Cited

U.S. PATENT DOCUMENTS

| | | | |
|---|---|---|---|
| 1,868,409 A * | 7/1932 | Crispen | 242/378.2 |
| 4,010,913 A * | 3/1977 | Guerster et al. | 242/378.1 |
| 5,022,600 A * | 6/1991 | Blanc et al. | 242/378.2 |
| 5,125,063 A | 6/1992 | Panuska et al. | |
| 5,915,062 A * | 6/1999 | Jackson et al. | 385/137 |
| 6,041,153 A | 3/2000 | Yang | |
| 6,522,826 B2 * | 2/2003 | Gregory | 385/135 |

* cited by examiner

*Primary Examiner*—Minsun Harvey
*Assistant Examiner*—Tuan N. Nguyen
(74) *Attorney, Agent, or Firm*—Y. Kateshov

(57) ABSTRACT

A dynamic compensator for a fiber optic cable having a jacket which is centered along a longitudinal axis, an elongated buffer tube surrounded by the jacket, and an elongated fiber surrounded by the buffer tube and dimensioned to move radially inwards and outwards within the buffer tube. The dynamic compensator includes a cable holder configured to receive and loop a portion of the fiber optic cable so that when the jacket elongates, the fiber extending along the loop is displaced radially inwards so as to release stresses upon end portions of the fiber, and when the jacket shrinks, the fiber is displaced radially outward to increase stresses upon the end portions of the fiber.

7 Claims, 2 Drawing Sheets

Known art $\Delta L = \pi^{*}(R2-R1)$

DYNAMIC COMPENSATOR FOR CONTROLLING STRESSES ON FIBER IN FIBER OPTIC CABLES

BACKGROUND OF THE DISCLOSURE

1. Field of the Disclosure

The invention relates to a device and method for dynamically compensating length changes undergone by a jacket of fiber cable so as to control stresses upon a fiber within the jacket.

2. Prior Art Discussion

Optical fiber lasers are heavily used in a variety of industrial application. The link between a fiber laser and a work station is known as a delivery or process fiber cable whose length may widely vary depending on a given architecture of system. Present cable structures fall into several categories one of which is disclosed in detail hereinbelow.

FIG. 1 illustrates a cross sectional view of delivery fiber cable 10 used, for example, in high power fiber lasers capable of guiding a kW beam. The cable 10 is configured with an outer jacket 12 circumscribing a metal sleeve 14 so that the opposing circumferences of respective jacket 12 and sleeve 14 are in continuous contact with one another. Placed inside sleeve 14 is a plastic buffer 16 spaced radially inwards from sleeve 14 and surrounding, in turn, a silica fiber 18. The fiber 18 is dimensioned so as to radially move relative to buffer 16 and has opposite ends coupled to respective fiber laser and work station.

As a rule, optical fiber cables, constructed as cable 10, are required to be operated without damage to fiber 18 over a wide range of temperatures leading the length change of cable 10. Often in the field, tensile forces applied to opposite ends of cable 10 and environmental humidity variation also account for the length variation of cable 10. Plastics which are normally used for the manufacturing of jacket 12 have a relatively high temperature coefficient of expansion and contraction and a relatively low tensile strength. In contrast, fiber 18 is configured with a relatively low temperature coefficient. Since silica fiber 18 along with cladding and coating are all relatively fragile, the length variations of jacket 12 may lead to additional pulling, tensile or compressing forces applied the opposite ends of fiber 18. The resulting mechanical stresses may detrimentally affect the parameters of fiber 18 and, sometimes, completely destroy the fiber 18.

A need, therefore, exists for providing a system—dynamic length compensator—capable of minimizing stresses upon a fiber in the configuration of FIG. 1 regardless of whether a cable jacket expands or contracts.

A further need exists for providing a method for configuring a dynamic length compensator.

SUMMARY OF THE DISCLOSURE

These needs are met by a dynamic length compensator minimizing the mechanical stresses applied to a fiber of fiber cable as a result of the length change of the cable's jacket. The device is operative to release the mechanical stresses regardless of whether the plastic jacket expands causing, thus, the deficit of the fiber length or shrinks causing the excess of the fiber.

The compensator includes a cable holder configured to shape a portion of fiber cable so that the portion has at least one full turn between the opposite ends of the cable which are fixed to respective end devices, such a fiber laser and work station. The cable holder is so structured that the fiber of the cable is immune to various mechanical stresses applied to the opposite ends during the elongation or contraction of the cable's jacket within the desired range. The cable is further configured with an outer plastic jacket surrounding a buffer tube, which is spaced radially inwards from the inner surface of the jacket and, in turn, surrounds the fiber loosely placed inside the buffer tube. But for the at least one complete turn, the fiber would be under constant mechanical stresses when the jacket either expands or contracts due temperature and/or humidity variations and tensile or compression forces applied to the opposite ends of the cable.

The structure of the holder allows to protect the fiber from experiencing mechanical stresses because within turned or looped portion of the cable the fiber may extend along either the outer circumference of buffer tube or the inner circumference thereof. Accordingly when the cable is subjected to tensile forces tending to elongate the cable's jacket, the fiber extending along the turn or turns is radially displaced towards the inner circumference of the buffer tube releasing thus stress on the opposite fiber ends. Conversely, the compression forces applied to the opposite ends of the cable cause the jacket of the cable to contract. The contraction of the jacket, in turn, is associated with the radial displacement of the fiber towards the outer circumference of the buffer tube. The displacement of the fiber radially outwards or inwards between the opposite circumferences of the tube respectively decreases or increases the length of the end portions of fiber 18 extending between the looped portion and end devices. The greater the length of the stretch, the smaller the tension, and conversely. In contrast, if the cable did not have at least one cable portion looped, the opposite ends of the fiber would be affected every time the jacked expanded or contracted.

The cable holder, thus, is shaped so that when a portion of cable is wound about the holder, this portion has a substantially circular cross section. Moreover, the holder is dimensioned to receive as many turns of the cable as necessary to obtain the acceptable range of the jacket length within which the integrity of the fiber is not compromised. In particular, the cable holder is configured to satisfy the following equation:

$$\Delta L = \pm n * \pi * (D-d)$$

where $\Delta L$—acceptable range of the jacket length changes, n—number of the cable turns, D—inner diameter of the buffer tube, and d—outer diameter of the fiber.

A method of manufacturing the disclosed dynamic length compensator allows for determining the desired range within which the cable's jacket can expand or elongated and shrink without affecting the integrity of the fiber due to the stresses caused by the increase or decrease of the cable's jacket. The method includes configuring a cable holder so that it is structured to receive as many turns of the cable as necessary to compensate for the change of the jacket length within the desired range.

BRIEF DESCRIPTION OF THE DRAWINGS

The above and other features and advantages of the disclosed compensator and method of configuring the latter will become more readily apparent from the following specific description illustrated by the drawings, in which.

SPECIFIC DESCRIPTION

Figure 1:
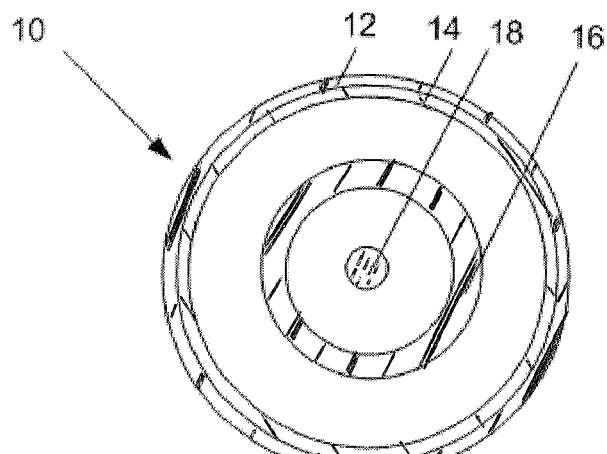
FIG. 1 is a cross-sectional view of a typical fiber cable.

Reference will now be made in detail to the disclosed system. Wherever possible, same or similar reference numerals are used in the drawings and the description to refer to the same or like parts or steps. The drawings are in simplified form and are far from precise scale. For purposes of convenience and clarity only, the terms "connect," "couple," and similar terms with their inflectional morphemes do not necessarily denote direct and immediate connections, but also include connections through mediate elements or devices. The terms "loop" and "turn" are used interchangeably.

Figure 2:
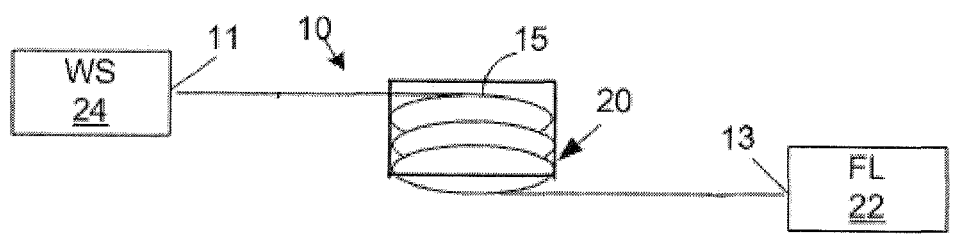
FIG. 2 is a diagrammatic view of a fiber laser system incorporating the disclosed dynamic compensator.

FIG. 2, discussed in conjunction with FIG. 1, illustrates a fiber laser system including a fiber laser 22, work station 24 and fiber optic cable 10 having its opposite ends coupled to respective laser 22 and work station 24. In the field, fiber optic cable 10 is exposed to a variety of stresses which are caused by, among others, tensile and compression forces applied to cable 10, temperature changes and/or humidity variations. As a result, all of the components of cable 10 tend to either expand or contract which create stresses on, among others, fiber 18 traversing jacket 12.

In accordance with one aspect of the disclosure, a dynamic length compensator 20 is configured to minimize the detrimental influence of the length change of jacket 12 on fiber 18. The compensator 20 is configured to receive a portion 15 of cable 10, which is located between the cable's end portions or stretches 11 and 13, coupled to respective fiber laser 22 and station 24, and provide portion 15 with a predetermined number of turns. The following helps explain why the provision of turn or turns substantially eliminates the mechanical dependence of fiber 18 from the length modification of cable 10 in general and jacket 12 in particular.

Figure 3:
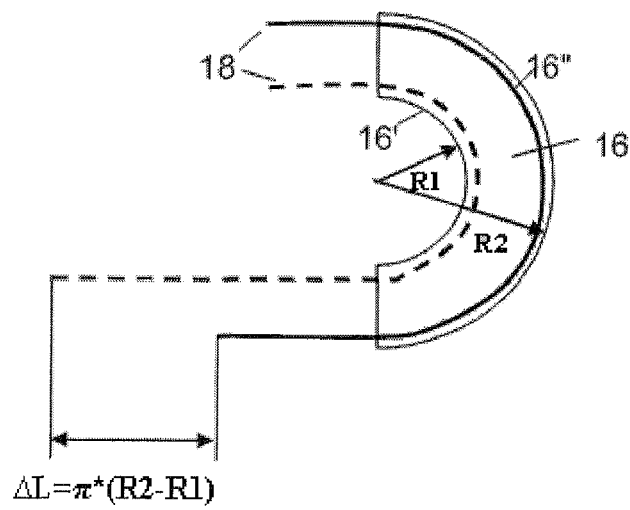
FIG. 3 is a diagrammatic illustration of the operation of the disclosed compensator.

FIG. 3 illustrates a part of cable 10 including only buffer tube 16 and fiber 18. Assuming that there are no other parts, when tube 16 is looped, fiber 18 may extend along distal or inner circumference 16", which is defined by a radius R2, or along proximal circumference 16' of tube 16 defined by a radius R1 smaller than radius R2. The difference between the inner and outer paths of fiber 18 along a turn corresponds to the increase/decrease of the distance between the opposite ends of fiber 18 (provided, of course, that at least one of the end portions is not fixed) and is determined as follows:

$$\Delta l = \pi (R_2 - R_1) \quad (1)$$

where $R_2 - R_1$ is the difference between outer and inner radii of tube 16.

As can be seen from the above, the configuration of compensator 20 (FIG. 2) may compensate for the deficit of the fiber length between the opposite end portions thereof due to the radial displacement of looped portion of fiber 18 by displacing it radially inwards within tube 16. Similarly, as cable 10 shrinks, the lopped portion of fiber 18 moves radially outward decreasing the length of the fiber end portions and, thus, increasing the tension. More specifically, when jacket 12 tends to expand due to forces applied to the opposite ends thereof, fiber 18 will shift toward and extend along the inner circumference 16' increasing the length of the fiber's end portions and, thus, reducing the stress at the end portions of fiber 18. In case of contraction of jacket 12, fiber 18 is radially displaced towards and extends along the outer circumference 16" so that the length of the fiber end stretches decreases while the stress on the fiber's end portions increases. The acceptable range within which the length of jacket 12 may change without affecting fiber 18, thus, can be determined as follows.

$$\Delta L = \pm \pi \cdot n \cdot (D-d) \quad (2)$$

Where n—number of turns of cable 10, D—inner diameter of tube 18, d—outer diameter of fiber 18.

As an example, consider an optic cable provided with five (5) turns. The inner diameter D of buffer tube inside the cable is 5 mm, whereas the outer diameter of fiber 0.5 mm. Using equation 2 in conjunction with FIG. 1, the elongation/shrinkage of jacket 12 within a 71 mm range does not lead to the existence of stresses at the end of fiber 18.

The dynamic compensator 20 (FIG. 2) may be implemented in numerous configuration. For example, it may be a circular structure, multi-piece structure or a single non-circular or circular structure.

Figure 4:
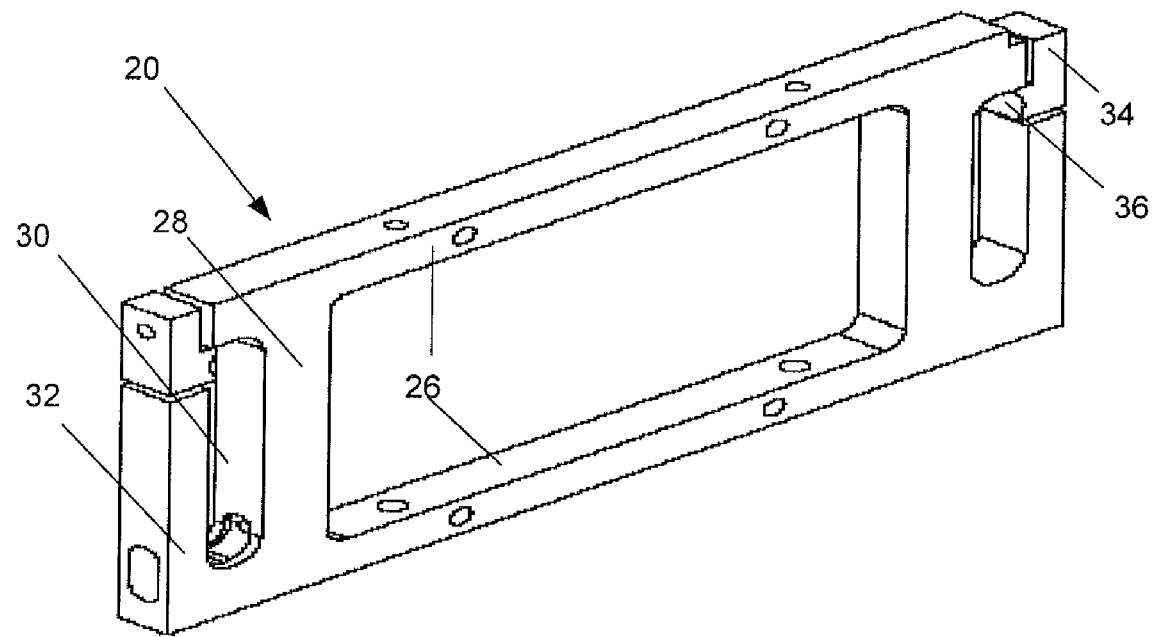
FIG. 4 is a perspective view of one of the embodiments of the disclosed dynamic compensator.

FIG. 4 illustrates one of multiple embodiments of dynamic compensator 20 including a rectangular body which is provided with a first pair of webs 26 and a second pair of webs 28 bridging webs 26. One of the webs 26 is longer than the other and provided with webs 32 each extending parallel to web 28 towards the other web 26. The webs 26 and 28 are so configured that each pair of opposing webs 32 and 28, respectively, define a slot 30 dimensioned to receive an n number of turns of cable 10 and have curved bottoms configured as a seat for the first turn. The compensator 20 also has a pair of L-shaped inserts 34 each detachably coupled to respective webs 32 and 26 to substantially close slot 30. The inner surface 36 of each insert 34 is outwardly curved to form a seat of the upper turn of cable 10. The compensator 20 is further configured with a plurality of passages receiving respective fasteners which couple the body of compensator 20 to a surface which preferably is located within the fiber laser. Since the diameters of the respective buffer tube and fiber are specified, the question remains only as to how many turns are necessary to provide for the desired length modification of the outer cable jacket.

Figure 5:
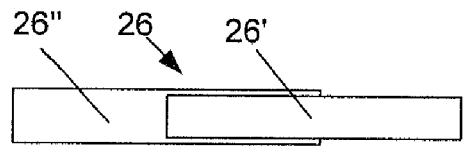
FIG. 5 is a diagrammatic view of the part of the compensator configured in accordance with another embodiment thereof.
Figure 6:
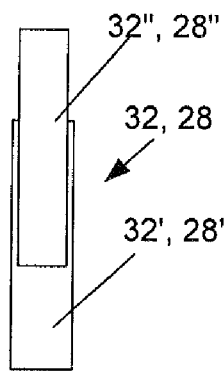
FIG. 6 is a diagrammatic view of the part of the compensator configured in accordance with a further embodiment thereof.

FIGS. 4 and 5 illustrate a modification of compensator 20 of FIG. 3. Based on the specified parameters of cable 10, it is possible that slot 30 of FIG. 4 is not capable of accepting the desired number of turns or too large for the latter. Furthermore, a cable may require a larger or smaller length of compensator 20 defining a diameter of the turn.

FIG. 4 illustrates a modification of compensator 20 in which webs 26 each has two telescopically displaceable parts 26' and 26", respectively. Displacing the parts relative to one another allows for providing the desired diameter of the cable turn. The diameter of each turn is defined by a threshold radius at which the fiber of the given fiber optic cable can be rolled without being damaged and which is determined experimentally. While using the same fiber optic cable dies not require the initially selected diameter, the latter may be helpful when a different type of cable is used.

FIG. 5 illustrates a further modification of the disclosed device configured to increase or decrease the length of slot 30. The necessary number of the turns depends from the specified overall length of the cable. This can be attained by providing each of parallel webs 32, 28, respectively with two displaceable relative to one another portion 28', 32' and 28", 32". All of the telescopic components are shaped to define slots 30. The mechanism for displacing the parts relative one another may have a variety of configuration.

Although shown and disclosed is what is believed to be the most practical and preferred embodiments, it is apparent that departures from the disclosed configurations and methods will suggest themselves to those skilled in the art and may be used without departing from the spirit and scope of the invention. Accordingly, the present invention is not restricted to the particular constructions described and illustrated in regard to, for example, green or yellows lasers, but should be construed to cohere with all modifications that may fall within the scope of the appended claims.

The invention claimed is:

1. A method for dynamically compensating a length change of a delivery optic cable having a fiber, a buffer tube having an inner surface, which is radically spaced from the fiber, and a jacket surrounding the buffer tube and centered along a longitudinal axis, the method comprising:
providing at least one looped portion of the optic cable between displaceably fixed opposite ends thereof,
radially displacing the fiber extending along the looped portion inwards in response to elongation of the jacket and outwards in response to contraction of the jacket, thereby releasing or increasing stresses upon the end portions of the fiber within a range determined as $\pm\pi*n*(D-d)$, where n—number of looped portions, D—inner diameter of the buffer tube, and d—outer diameter of the fiber.

2. The method of claim 1, wherein providing the at least one looped portion includes configuring a dynamic compensator configured to provide the at least one looped portion.

3. A dynamic compensator for a fiber optic cable having a jacket which is centered along a longitudinal axis, an elongated buffer tube surrounded by the jacket, and an elongated fiber surrounded by the buffer tube and dimensioned to move radially inwards and outwards within the buffer tube, the dynamic compensator comprising a cable holder configured to receive and loop a portion of the fiber optic cable so that when the jacket elongates, the fiber within the loop is displaced radially inward and releases stresses upon end portions of the fiber, and when the jacket shrinks, the fiber is displaced radically outward to increase stresses upon the end portions of the fiber, wherein a range of displacement of the jacket is equal to $\pm\pi*n*(D-d)$, where n—number of looped portions, D—inner diameter of the buffer tube, and d—outer diameter of the fiber.

4. The dynamic compensator of claim 3, wherein the cable holder is dimensioned to receive more than the at least one loop.

5. The dynamic compensator of claim 3, wherein the cable holder is configured with a multiple slots configured to receive the loop portion of the cable.

6. The dynamic compensator of claim 5, wherein the cable holder is operative to adjust a size of the slots and a diameter of the loop.

7. A fiber laser system comprising:
a fiber laser;
a work station;
a fiber optic cable coupling the fiber laser to the work station and including an outer jacket, which is centered along a longitudinal axis, a buffer tube within the jacket and a fiber traversing the tube and configured to move radially within the tube; and
a dynamic compensator configured to receive and loop a portion of the fiber optic cable so that when the jacket elongates, the fiber extending along the loop is displaced radially inwards releasing stresses upon end portions of the fiber, and when the jacket shrinks, the fiber is displaced radially outward increasing stresses upon the end portions of the fiber, wherein the jacket is displaced within a range equal to $\pm\pi*n*(D-d)$, where n—number of loops, D—inner diameter of the buffer tube, and d—outer diameter of the fiber.

* * * * *